Oct. 3, 1961 W. H. FISCHER 3,002,850
GRAPHITE FLAKE COATED LOW FRICTION SHEET MATERIAL
Filed Aug. 26, 1959

INVENTOR.
William H. Fischer,
BY Hofgren, Brady,
Wegner, Allen & Stellman
Atty's.

United States Patent Office 3,002,850
Patented Oct. 3, 1961

3,002,850
GRAPHITE FLAKE COATED LOW FRICTION SHEET MATERIAL
William H. Fischer, % Process Engineering Corp., Crystal Lake, Ill.
Filed Aug. 26, 1959, Ser. No. 836,055
7 Claims. (Cl. 117—33)

This invention relates to a sheet material having a low friction surface.

In certain installations such as in commercial sanding machines it has become customary to use a low friction material as a backing behind the movable abrasive member such as the abrasive belt. Such low friction materials may also be efficiently used over hand blocks, platens of edge sanders, on drawer sanders, nose blocks and the like to minimize frictional heat and wear. A customary type of such friction material is canvas or other flexible sheet material provided with a low friction surface and particularly that provided by a coating of graphite in a flexible binder. The use of such a low friction material greatly extends the life of abrasive belts and the like used in contact with the material and also results in a better sanding and abrading operation.

The sheet material of this invention is superior to that previously proposed in that the proportions of the ingredients including graphite and the arrangement of the graphite in layers as well as the type of graphite and other compounding ingredients results in a low friction sheet material that is superior to that previously proposed and has a longer life, particularly under conditions of severe use.

One of the features of this invention therefore is to provide an improved sheet material having a low friction surface comprising a flexible supporting sheet, and preferably a fabric sheet, coated with an acrylic resin having in combination therewith graphite of certain specified characteristics and amounts.

A further feature of the invention is to provide an improved method of making such a low friction sheet material.

Other features and advantages of the invention will be apparent from the following description thereof taken together with the accompanying drawings.

Figure 1:
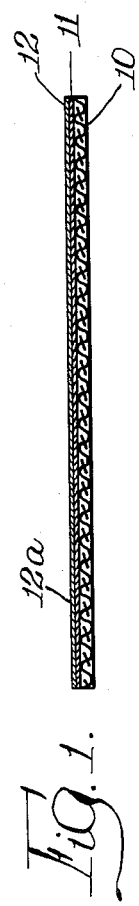
Figure 2:
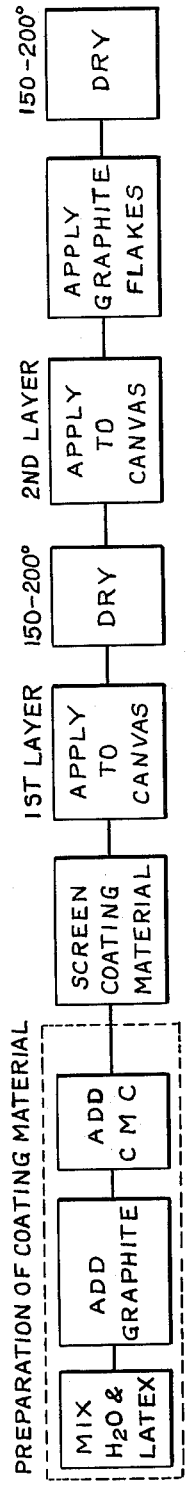

Of the drawings:

FIGURE 1 is an enlarged vertical sectional view of the sheet material of this invention; and FIGURE 2 is a flow diagram of the method of this invention.

The sheet material of this invention having a low friction surface comprises a flexible supporting sheet 10 and preferably a fabric sheet which in a preferred instance is cotton canvas that is coated by applying to one surface thereof a coating composition 11 and 12 made up of the following ingredients—2 parts of acrylic resin emulsion latex (AC-33 made by Rohm & Haas and containing 46% solids), from 0.75–1.25 parts water, from 0.75–1.25 parts of fine graphite having a maximum particle size of between 60 and 200 mesh ASTM screen in that not more than 10% of the particles are retained on a screen having a mesh size within this range, about 1–1.5 parts of graphite grains graded as BB 4 or 5 and being grains that are substantially entirely retained on a 50 mesh screen but passing through a 35 mesh screen and from 0.05–0.1 part of a thickener. AC-33 is produced by the following procedure:

There are mixed 93.2 parts of methyl methacrylate, 24.4 parts of aqueous 70% octylphenoxypolyethoxyethanol with about 35 ether groups, and 629 parts of water. While this mixture is stirred, there is added 12 parts of aqueous 25% potassium hydroxide solution. The mixture is stirred for five minutes while 1.3% of the methacrylate is saponified. To this are added 188 parts of ethyl acrylate, 0.456 part of sodium hydrosulfite, and aqueous ferrous sulfate to supply 3 p.p.m. of iron. The mixture is cooled to 15° C. and tert.-butyl hydroperoxide (60%) is gradually added to a total of four parts. The temperature of the batch reaches 70° C. When reaction has abated, the batch is cooled.

A separate mixture is made of 21.6 parts of the same emulsifier, 37 parts of water, 105 parts of methyl methacrylate, and 13.5 parts of 25% potassium hydroxide solution. The pH of this mixture drops to a value of 8. It is then poured into the above dispersion and 212 parts of ethyl acrylate are added, followed by 0.55 part of sodium hydrosulfite and an additional 3 p.p.m. of iron as ferrous sulfate. Catalyst is then slowly dropped in to a total of 2.9 parts. The temperature rises to 63° C. About 800 parts by volume of the resulting dispersion of interpolymer is treated with one volume of concentrated ammonium hydroxide. The pH of the suspension is then 10. It contains 46.7% solids, corresponding to a yield of interpolymer of 96.8%.

In producing the above coating composition the water is added to the AC-33 and then the fine graphite is mixed in, following this the graphite grains are added and then the thickener. The thickener can be any of those ordinarily employed and known to have thickening action of which there are a great many used in industry. The thickening is a physical function and thus there are vast numbers of thickeners that can be used. Among the most common are carboxy methyl cellulose, the various clays including bentonite and bentonite derivatives, alkyl cellulose such as methyl cellulose, hydroxy ethyl cellulose and the like.

Before being applied to the sheet material the coating composition is preferably strained through a wire screen such as a 1/16 inch screen to remove scum, lumps and the like. The composition is then applied to the sheet material such as cotton canvas and smoothed out as with a doctor blade to a thin uniform first coating 11. It is then dried under heat and a second coating 12 is applied. Ordinary flake graphite is then applied immediately to the surface 12a of the wet second coating by sprinkling the flakes on the wet surface in an amount that is at least enough to cover and adhere to the wet surface. The coating is then dried and any excess flake graphite that did not adhere is removed. The product is then ready for use.

In one example of producing the article of this invention as shown in the flow chart FIGURE 2, a coating material is prepared by adding one part of water to two parts of the above-identified AC-33 acrylic emulsion latex. Then one part of graphite is added with the graphite having not more than 10% of its particles retained on a 200 mesh screen and the graphite is thoroughly mixed in. Then one part of graphite grains is added with these grains being substantially all of a size retained on a 40 mesh screen but passing through a 35 mesh screen. Finally about 0.1 part of carboxy methyl cellulose is added as a thickener. The mixture is then mixed thoroughly and passed through a 1/16 inch screen. The coating material is then applied to the canvas in a first layer by passing the canvas with the material thereon under a doctor blade spaced to give a coating that is 0.037–0.039 inch thick. This coating is dried at 150–200° F. until the coating is completely dry. Then a second coating of the same material is applied over the dried first coating by passing the flexible material and applied coating under a doctor blade spaced to give a second coating that is 0.098–0.041 inch thick. Immediately while the second coating is wet graphite flakes are applied by sprinkling the flakes on the wet second coating to give a uniform distribution and in an amount sufficient at least to cover the wet coating completely. This second coating with the adhered graphite flakes is then dried as specified and any excess flakes are removed.

The parts and percentages given herein are by weight. The mesh sizes are those of standard ASTM screens.

Having described my invention as related to the embodiment set out herein, it is my intention that the invention be not limited by any of the details of description, unless otherwise specified, but rather be construed broadly within its spirit and scope as set out in the accompanying claims.

I claim:

1. A sheet material having a low friction surface, comprising: a flexible supporting sheet; a thin coating thereon of a flexible, adherent, non-tacky binder containing about 0.75–1.25 parts fine graphite having not more than about 10% retained on a 60 mesh screen and a major portion passing through a 200 mesh screen and about 1–1.5 parts of graphite grains substantially all of which pass through a 35 mesh screen but are substantially entirely retained on a 50 mesh screen; and a surface covering of graphite flakes partially embedded in said coating, all said parts and percentages being by weight.

2. The sheet material of claim 1 wherein said binder is a member of the class consisting of synthetic resins and glues.

3. A sheet material having a low friction surface, comprising: a flexible supporting sheet; a thin continuous coating thereon of an acrylic resin deposited from an acrylic resin dispersion latex mixture consisting essentially of 2 parts of said latex, about 0.75–1.25 parts water, about 0.75–1.25 parts fine graphite having not more than about 10% retained on a 60 mesh screen and a major portion passing through a 200 mesh screen, about 1–1.5 parts of graphite grains substantially all of which pass through a 35 mesh screen and are retained on a 50 mesh screen and about 0.05–0.1 part of a thickener; and a surface covering of graphite flakes partially embedded in said coating, all said parts and percentages being by weight.

4. A sheet material having a low friction surface, comprising: a flexible supporting fabric sheet; a thin continuous coating thereon of an acrylic resin deposited from an acrylic resin dispersion latex mixture consisting essentially of 2 parts of said latex containing about 46% of solids; about 0.75–1.25 parts water, about 0.75–1.25 parts fine graphite having not more than about 10% retained on a 60 mesh screen and a major portion passing through a 200 mesh screen, about 1–1.5 parts of graphite grains substantially all of which pass through a 35 mesh screen and are retained on a 50 mesh screen and about 0.05–0.1 part of a thickener; and a surface covering of graphite flakes partially embedded in said coating, all said parts and percentages being by weight.

5. The method of making a sheet material having a low friction surface, comprising: applying to one side of a flexible supporting sheet a mixture comprising a liquid coating of a binder containing about 0.75–1.25 parts fine graphite having not more than about 10% retained on a 60 mesh screen and a major portion passing through a 200 mesh screen, and about 1–1.5 parts of graphite grains substantially all of which pass through a 35 mesh screen and are retained on a 50 mesh screen; applying to said coating while wet a covering of graphite flakes in an amount that is substantially the maximum that will adhere thereto; and drying said coating.

6. The method of making a sheet material having a low friction surface, comprising: applying to one side of a flexible supporting sheet a mixture comprising 2 parts of an acrylic resin dispersion latex, about 0.75–1.25 parts water, about 0.75–1.25 parts fine graphite having not more than about 10% retained on a 60 mesh screen and a major portion passing through a 200 mesh screen, about 1–1.5 parts of graphite grains substantially all of which pass through a 35 mesh screen and are retained on a 50 mesh screen and about 0.05–0.1 part of a thickener; drying said mixture to produce a first coating; applying a second coating of said mixture over the first coating; sprinkling over said second coating while wet a covering of graphite flakes in an amount that is substantially the maximum that will adhere thereto; and drying said second coating, all said parts and percentages being by weight.

7. The method of making a sheet material having a low friction surface, comprising: applying to one side of a flexible supporting fabric sheet a mixture comprising 2 parts of an acrylic resin dispersion latex containing about 46% of solids, about 0.75–1.25 parts water, about 0.75–1.25 parts fine graphite having not more than about 10% retained on a 60 mesh screen and a major portion passing through a 200 mesh screen, about 1–1.5 parts of graphite grains substantially all of which pass through a 35 mesh screen and are retained on a 50 mesh screen and about 0.05–0.1 part of a thickener; drying said mixture to produce a first coating; applying a second coating of said mixture over the first coating; sprinkling over said second coating while wet a covering of graphite flakes in an amount that is substantially the maximum that will adhere thereto; and drying said second coating, all said parts and percentages being by weight.

References Cited in the file of this patent

UNITED STATES PATENTS 2,879,178     McWherter     Mar. 24, 1959